United States Patent [19]

Sugiyama et al.

[11] Patent Number: 5,276,527
[45] Date of Patent: Jan. 4, 1994

[54] COMPACT PORTABLE RECORDING APPARATUS WITH THIN, FLAT CASE, AND WHICH RECEIVES RECORDING PAPER ON AN UPPER SURFACE THEREOF

[75] Inventors: Hideaki Sugiyama, Mishima; Isao Sano, Fuji; Masao Kobori; Hiroaki Sudo, both of Mishima, all of Japan

[73] Assignee: Tokyo Electric Co., Ltd., Tokyo, Japan

[21] Appl. No.: 832,738

[22] Filed: Feb. 7, 1992

[30] Foreign Application Priority Data

| Feb. 14, 1991 | [JP] | Japan | 3-40768 |
| Mar. 13, 1991 | [JP] | Japan | 3-48260 |
| Mar. 19, 1991 | [JP] | Japan | 3-54982 |
| Mar. 19, 1991 | [JP] | Japan | 3-54985 |

[51] Int. Cl.⁵ ............ H04N 1/23; B41J 11/58; B41J 29/02; B65H 16/00; B65H 23/00; H01M 2/10
[52] U.S. Cl. .................... 358/296; 346/134; 346/136; 346/145; 400/613; 400/613.2; 400/692; 400/693; 242/55.2; 242/55.53; 242/68.7; 242/75.2; 429/97
[58] Field of Search .......... 358/296; 346/134, 136; 400/594, 605, 611, 613, 613.1, 613.2, 615, 619, 690.4, 691, 692, 693; 242/68.7, 197, 199, 68, 71.1, 75, 75.2, 75.4, 55.2, 55.53; 429/96, 97; 439/500

[56] References Cited

U.S. PATENT DOCUMENTS

| 2,743,806 | 5/1956 | Haines | 400/619 |
| 4,626,924 | 12/1986 | Watanabe . | |
| 4,632,585 | 12/1986 | Oyamatsu et al. | 400/613 |
| 4,904,100 | 2/1990 | Enix | 400/693 |
| 4,933,753 | 6/1990 | Watanabe . | |
| 5,019,465 | 5/1991 | Herron et al. | 429/97 |
| 5,138,463 | 8/1992 | Morimoto et al. | 358/296 |

FOREIGN PATENT DOCUMENTS 0201921 11/1986 European Pat. Off. .

Primary Examiner—Edward L. Coles, Sr.
Assistant Examiner—Scott A. Rogers
Attorney, Agent, or Firm—Frishauf, Holtz, Goodman & Woodward

[57] ABSTRACT

A recording apparatus has a main body case housing a printing head. A recording-paper insertion slot is formed in the upper surface of the case and a recording paper discharge slot is formed in the side surface of the case. A pair of stop levers are mounted on the upper surface so as to be pivotable between standing and horizontal positions. A part of the upper surface is used as a continuous-recording-paper receiving portion on which the recording paper is placed and is led to the insertion slot. The standing stop levers contact the insertion-slot-side end of the recording paper to hold it in its predetermined posture or position and restricts the movement of the recording paper toward the insertion opening.

13 Claims, 9 Drawing Sheets

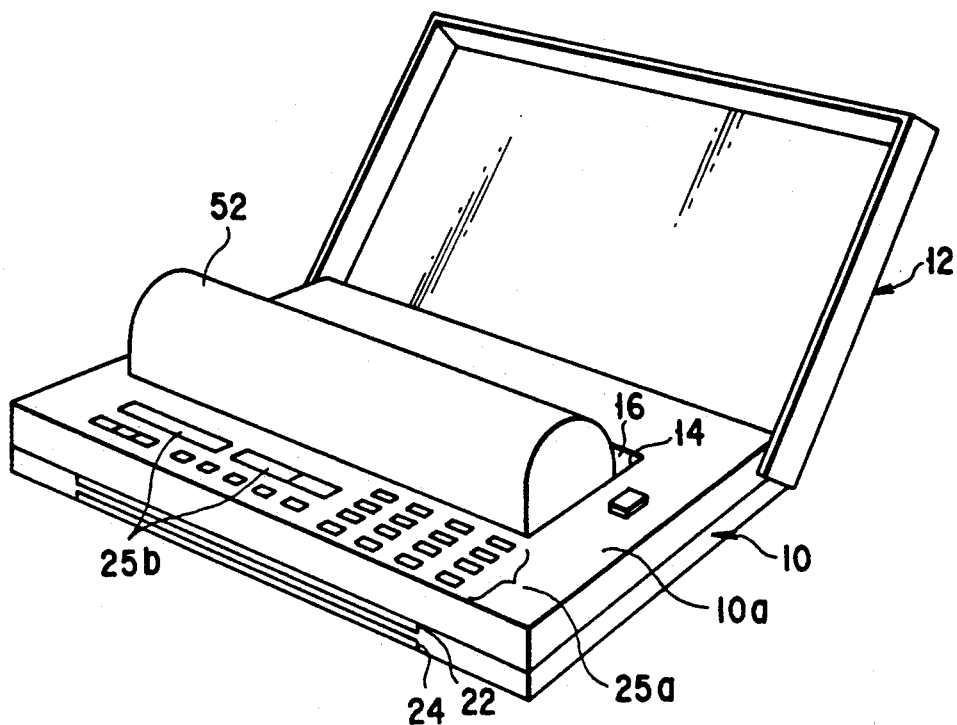
F I G. 6
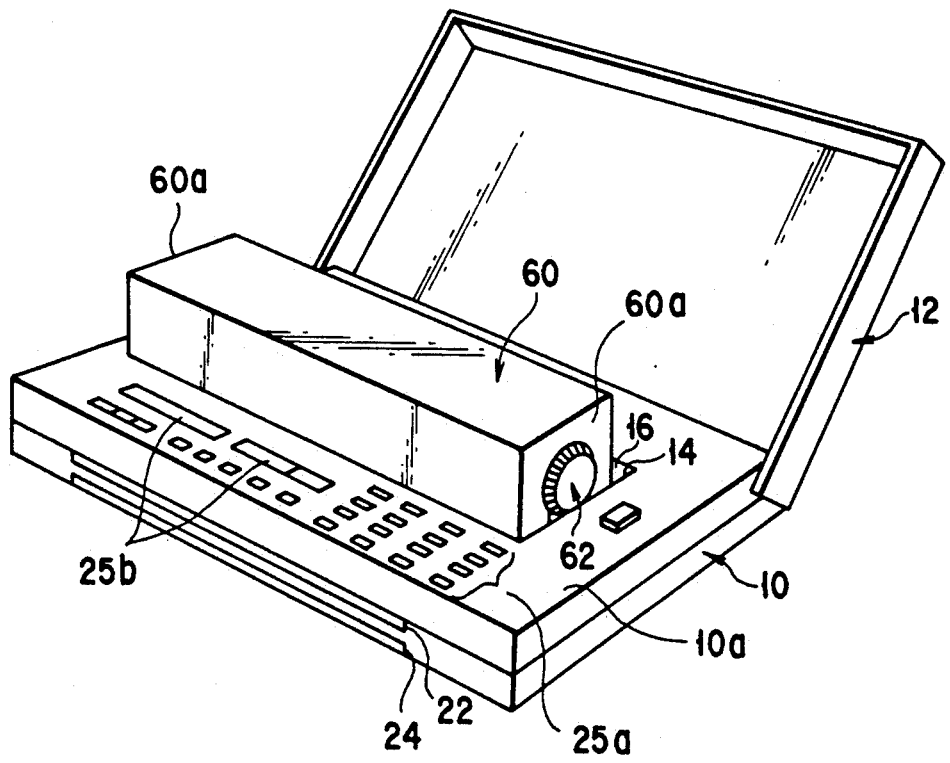
F I G. 7

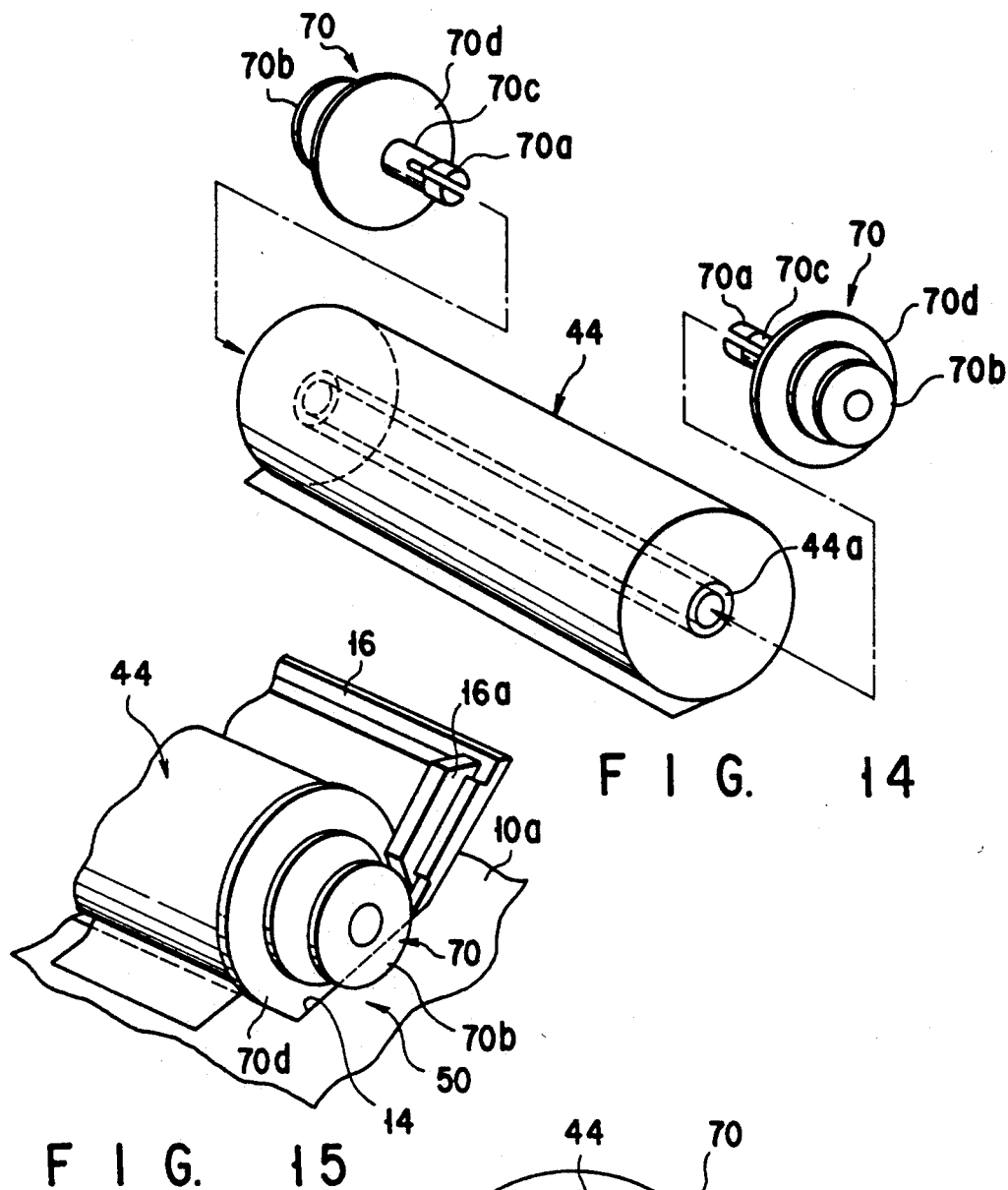
FIG. 14
FIG. 15
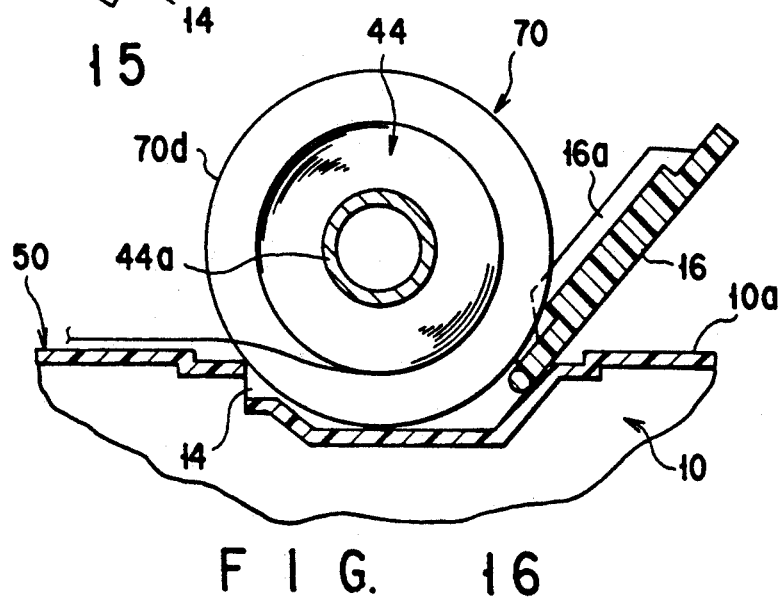
FIG. 16

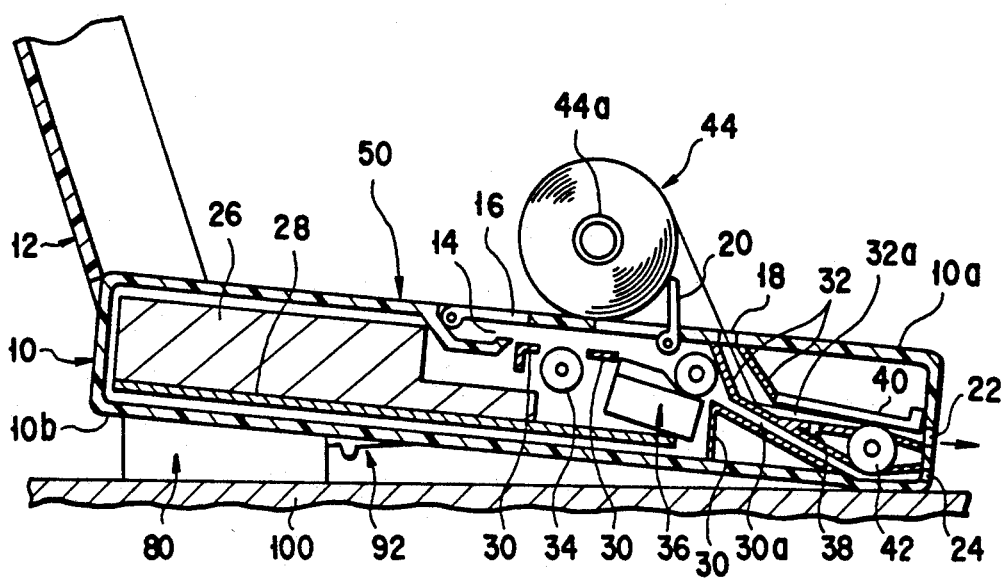
F I G. 17
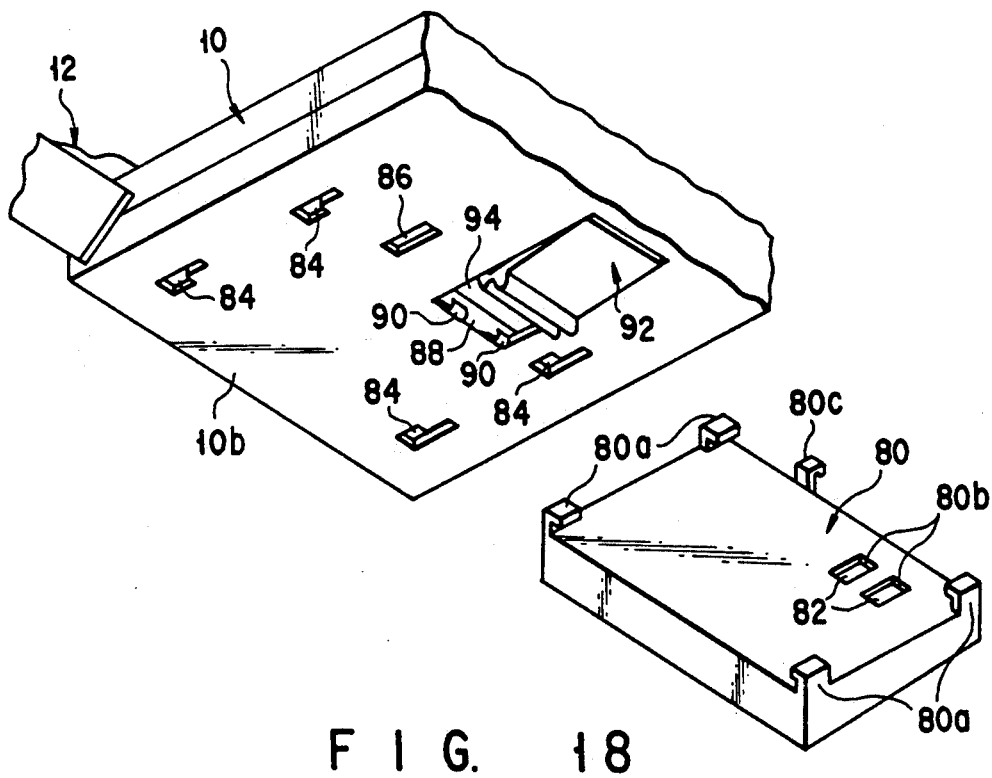
F I G. 18

COMPACT PORTABLE RECORDING APPARATUS WITH THIN, FLAT CASE, AND WHICH RECEIVES RECORDING PAPER ON AN UPPER SURFACE THEREOF

BACKGROUND OF THE INVENTION

1. Field of the Invention

This invention relates to a recording apparatus, in which a recording paper fed to printing means in a main body case is discharged from the main body case through a recording-paper discharge opening after an image such as a character, figure, and drawing is recorded on the recording paper by the printing means.

2. Description of the Related Art

A recording apparatus of the above described type is incorporated in a facsimile apparatus, and is used for printing images, corresponding to image signals that the apparatus receives, on a recording paper and for printing predetermined data, relating to the received image signals in the apparatus, on the recording paper.

A conventional facsimile apparatus receives a rolled continuous recording paper in a recording-paper receiving space provided in its main body case, and the recording paper is drawn out from the receiving space and is fed to a printing means. The rolled recording paper has a large diameter and is heavy, so that the main body case of the facsimile apparatus has inevitably a large size and is heavy. Therefore, such conventional facsimile apparatus is not suitable for being carried by hand.

Since the height of a facsimile apparatus is set at, for example, about 30 mm in order to make it suitable for being carried by hand, the diameter of a rolled continuous recording paper that can be received in the main body case will be approximately 26 mm. The unrolled overall length of the rolled recording paper having such diameter will be approximately 5.5 m, and it is equal to the total length of approximately 18 sheets of paper of A4 size (210 mm wide × 297 mm long) which is the most prevailing size for a recording paper used in a facsimile apparatus in Japan.

Therefore, the facsimile apparatus cannot continuously receive an amount of image signals which need more than 18 sheets when they are printed, and even if the apparatus only receives an amount of image signals which need less than 18 sheets, it will require frequent supply of new rolls of printing paper.

SUMMARY OF THE INVENTION

In view of the above described circumstances, the object of the present invention is to provide a recording apparatus that can record continuously a huge number of images and which does not require frequent supply of a unit of new continuous printing paper even if the thickness or height of the recording apparatus, such as a facsimile apparatus, is made small to make it suitable for being carried by hand.

The above object of the present invention is achieved by a compact type portable recording apparatus comprising a flat main body case having a substantially flat upper surface, a recording-paper insertion opening formed in the substantially flat upper surface, and a recording-paper discharge opening positioned in the main body case at a position lower than the recording-paper insertion opening, said flat main body case not carrying a supply of recording paper in the interior thereof. A recording head and recording head control means are both contained in the main body case. The recording head records images on a recording paper which is fed through the recording-paper insertion opening, under the control of the recording head control means. A recording-paper receiving portion is provided on the substantially flat upper surface of the main body case at a position adjacent to the recording-paper insertion opening and is located above both the recording head and recording head control means, and on which a continuous recording paper is laid by a user. Further provided is an engaging and movement restricting means, mounted on the recording-paper receiving portion and projecting upward, for engaging and holding a remaining part of the continuous recording paper and for restricting a movement of the remaining part of the continuous recording paper toward the recording-paper insertion opening, while a part of the continuous recording paper is inserted into the main body case through the recording-paper insertion opening and is discharged from the main body case through the recording-paper discharge opening after an image has been recorded on the inserted part of the continuous recording paper by the recording head in the main body case.

In the recording apparatus constructed as described above in accordance with the present invention, by forming the recording-paper insertion opening in the upper surface of the main body case and by mounting the recording-paper receiving portion on the upper surface of the main body case, a continuous recording-paper receiving space can be deleted from the inner space of the main body case so that the main body case can be made thinner to make it suitable for being carried by hand.

In a case that it is needed to record images with the recording apparatus according to the invention, at first for example a rolled continuous recording paper or a continuous recording paper folded in a predetermined length is placed on the recording-paper receiving portion, and then leading end portion of the recording paper is drawn into the main body case through the recording-paper insertion opening in the upper surface of the main body case. In this state, the recording head of the recording apparatus can record the image, such as character, figure, and drawing, on the continuous recording paper, and the part of the continuous recording paper on which image has been recorded is gradually discharged from the main body case through the recording-paper discharge opening.

A continuous recording paper of desired length can be laid on the recording-paper receiving portion on the upper surface of the main body case without considering the volume of the main body case.

While a part of the continuous recording paper laid on the recording-paper receiving portion is inserted into the main body case through the recording-paper insertion opening in the upper surface of the main body case and is discharged from the main body case through the recording-paper discharge opening after images have been recorded on the inserted part of the continuous recording paper by the recording head in the main body case, the remaining continuous recording paper.holding and movement restricting means, which is mounted on the upper surface of the main body case, holds a remaining part of the continuous recording paper, which remains on the recording-paper receiving portion, in its predetermined posture or position on the receiving portion, and restricts a movement of the remaining part of the continuous recording paper toward the recording-paper insertion opening.

Thus, the remaining continuous recording paper-holding and movement restricting means prevents the remaining part of the continuous recording paper from being stuffed in the recording-paper insertion hole.

When a rolled continuous recording paper is used in the recording apparatus in accordance with the invention, the recording apparatus can comprise, as a part of the remaining continuous recording paper.holding and movement restricting means, a cover, which is removably attached to the upper surface of the main body case and which covers the continuous recording paper, laid on the recording-paper receiving portion, and the recording-paper insertion opening.

Such a cover can effectively prevent the remaining part of the rolled continuous recording paper on the recording-paper receiving portion from being laterally displaced while the recording head is recording images such as characters, figures, and drawings on the inserted part of the rolled continuous recording paper in the main body case. It can also prevent foreign matters from adhering to the surface of the rolled continuous recording paper. Thus, the leading end of the continuous recording paper and the subsequent part thereof is prevented from being obliquely drawn out from the rolled continuous recording paper on the recording-paper receiving portion so that the recording-paper insertion opening is prevented from being stuffed with the obliquely drawn out part of the continuous recording paper and the quality level of printing is prevented from being lowered by the attachment of the foreign matters on the continuous recording paper.

In the recording apparatus in accordance with the present invention, it is preferable that the remaining continuous recording paper.holding and movement restricting means includes a stop lever mounted on the upper surface of the main body case so as to be pivotable between a horizontal position where the stop lever is located in the same plane as the upper surface of the main body case and a standing position where the stop lever is standing up from the upper surface of the main body case. The stop lever preferably abuts the recording-paper insertion opening side end of the circular surface of the rolled continuous recording paper when it is positioned at its standing position, so that the stop lever holds the remaining part of the continuous recording paper on the recording-paper receiving portion to keep its predetermined posture or position and restricts the movement of the remaining part toward the recording-paper insertion hole.

Such a stop lever is effective with both the rolled continuous recording paper and the continuous recording paper folded in a predetermined length, and is simple in construction so that it can be manufactured at low cost.

In a case that the recording apparatus uses a rolled continuous recording paper, it is preferable that the remaining continuous recording paper.holding and movement restricting means includes a continuous-recording-paper rotatably holding member which is detachably attached to the recording-paper receiving portion on the upper surface of the main body case and rotatably holds both longitudinal ends of the rolled continuous recording paper.

In a case that the remaining continuous recording paper.holding and movement restricting means includes the continuous-recording-paper rotatably holding member as described above, it is preferable that the continuousrecording-paper rotatably holding member includes a pair of shaft portions coaxially and detachably attached to both longitudinal ends of the rolled continuous recording paper, and a cover portion detachably holding the paired shaft portions, allowing rotation of the paired shaft portions and covering the entire outer surface of the rolled continuous recording-paper and the recording-paper insertion opening in the upper surface of the main body case while the cover is detachably attached to the recording-paper receiving portion.

The recording apparatus in accordance with the present invention may further comprise image reading means in the inner space of the main body case, and the main body case may further comprises an image-carrying recording-paper insertion opening, through which an image carrying recording paper carrying an image to be electrically transmitted or copied is inserted into the inner space of the main body case, and an image-carrying recording-paper discharge opening, through which the image carrying recording paper is discharged from the inner space after the image carried on the recording paper is read by the image reading means. In this case the image-carrying-recording-paper insertion opening should be arranged in a region of the recording-paper receiving portion on the upper surface of the main body case so that the image-carrying-recording-paper insertion opening can become a part of the recording-paper receiving portion.

The recording apparatus in accordance with the present invention may further comprise a battery box detachably attached to a lower surface of the main body case, the lower surface being located in the back side of the main body case in relation to the upper surface on which the recording-paper receiving portion is located. In this case it is preferable that an opening is formed in the lower surface of the main body case, through which electrical terminals to be connected with terminals of the battery box are exposed, and a bottom lid is mounted to be movable between a closed position wherein the opening is covered by the bottom lid and an open position where the opening is fully exposed.

By moving the bottom lid to the closed position when the battery box is not used, the closed lid prevents entering of dust and any electrical conductors such as paper clips and staples into the inner space of the main body case through the opening, so that the electrical terminals within the opening are prevented from being short circuited.

It is preferable that the bottom lid does not contact a surface of an object when the bottom lid position is in the closed position and the main body case is laid on the surface of the object, and that it abuts the surface of the object to separate by a predetermined distance the opening in the lower surface of the main body case from the surface of the object when the bottom lid is positioned in the open position and the main body case is laid on the surface of the object.

Such a bottom lid can effectively prevent electrical conductors such as paper clips and staples from entering into the inner space of the main body case through the opening so that shortcircuiting between the electrical terminals in the opening can be prevented even when the battery box is not used and the recording apparatus is laid on the upper surface of the object such as a desk with the bottom lid being positioned in its open position.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a perspective view of a modification of the first embodiment of FIG. 1;

FIG. 7 is a schematic perspective view of a portable facsimile apparatus as a recording apparatus of a second embodiment of the present invention;

FIG. 14 is a schematic perspective view showing the rolled continuous recording paper and the paired shaft members for supporting both ends of the winding shaft of the rolled continuous recording paper of the portable facsimile apparatus of FIG. 12, the paired shaft members being separated from the winding shaft;

FIG. 15 is an enlarged schematic perspective view showing one longitudinal end portion of the original insertion slot of the portable facsimile apparatus of FIG. 12 and the corresponding one end portion of the rolled continuous recording paper held by the paired shaft members at the original insertion slot;

FIG. 16 is a schematic cross sectional view showing the original insertion slot of the portable facsimile apparatus of FIG. 12, in which the rolled continuous recording paper is held by the paired shaft members, at the original insertion slot;

FIG. 17 is a schematic longitudinal sectional view of a portable facsimile apparatus as a recording apparatus of a fourth embodiment of the invention, in which a rolled continuous recording paper is laid on a recording-paper receiving portion on an upper surface of a main body case of the portable facsimile apparatus, and in which a battery box is detachably attached to a lower surface of the main body case;

FIG. 18 is an exploded schematic perspective view showing the lower surface of the main body case and the upper surface of the battery box of the portable facsimile apparatus of FIG. 17, in which the battery box is detached from the main body case;

DETAILED DESCRIPTION OF THE PREFERRED EMBODIMENTS

A first embodiment of the present invention and a modification of the first embodiment will be described by referring to FIGS. 1 through 6 of the accompanying drawings.

Figure 1:
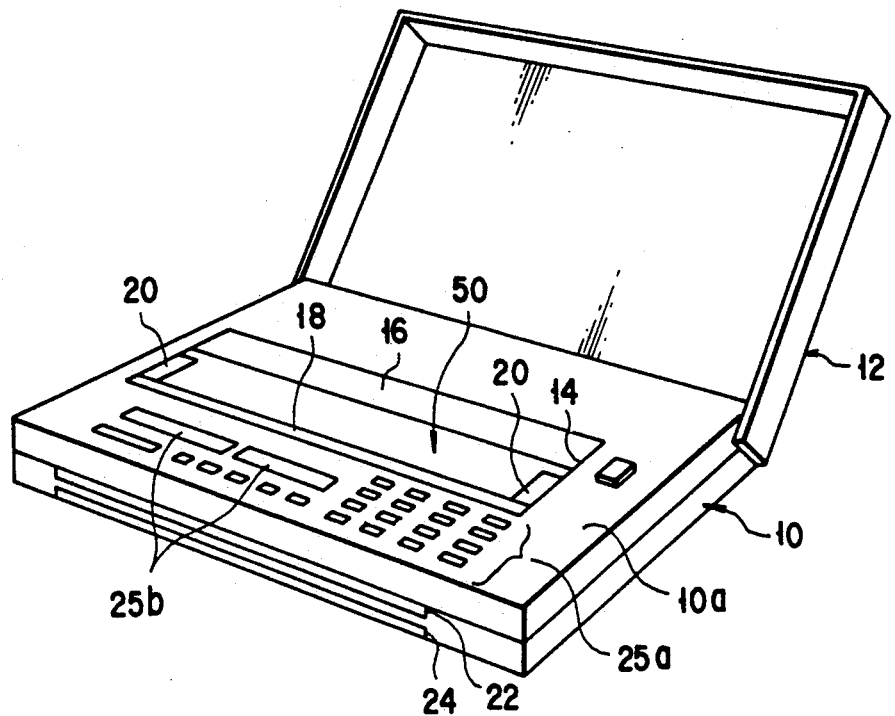
FIG. 1 is a schematic perspective view of a portable facsimile apparatus, which is a recording apparatus of a first embodiment of the invention.
Figure 2:
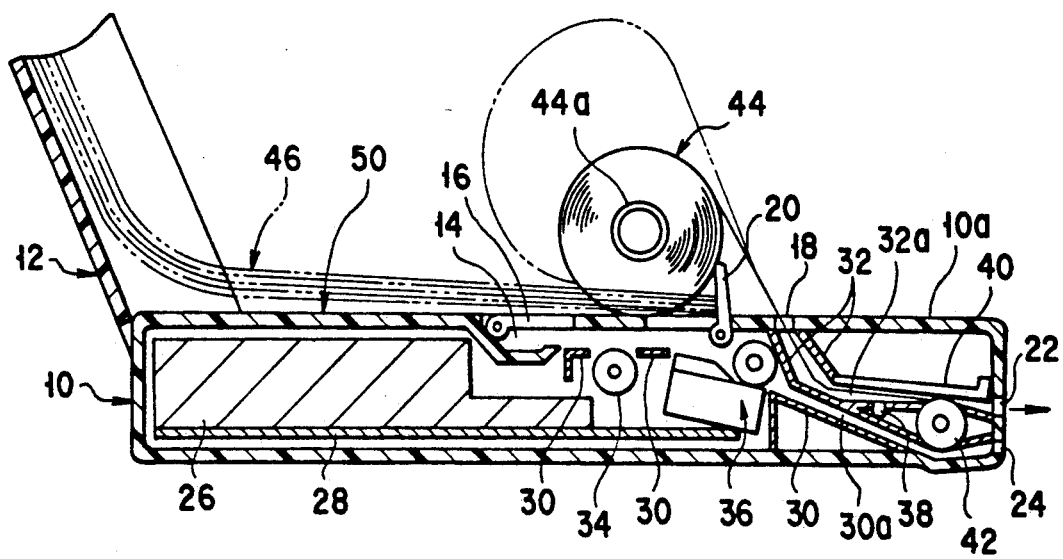
FIG. 2 is a schematic longitudinal sectional view of the portable facsimile apparatus of FIG. 1, in which a rolled continuous recording paper or a continuous recording paper folded in a predetermined length is laid on a recording-paper receiving portion on an upper surface of a main body case of the portable facsimile apparatus, and is held in its predetermined position on the recording-paper receiving portion and is prevented from being moved toward a recording-paper insertion slot by stop levers.

A portable facsimile apparatus as a recording apparatus of the first embodiment is schematically shown in FIG. 1, and a longitudinal section of the portable facsimile apparatus of FIG. 1 is schematically shown in FIG. 2 in a state that one of various continuous recording papers is laid on a recording-paper receiving portion in an upper surface portion of a main body case. This portable facsimile apparatus can transmit and receive facsimile signals.

A main body case 10 of the portable facsimile apparatus has a note-book shape, and a main body cover 12 for covering an upper surface 10a of the main body case 10 is rotatably attached to rear end portions of the both side surfaces of the main body case 10. The main body cover 12 can rotate between a closed position where it covers the upper surface 10a of the main body case 10 and an open position where it inclines toward an up-backward direction in relation to the main body case 10 and is detached or separated from the upper surface 10a as shown in FIG. 1.

An original insertion slot (image carrying recording paper inserting slot) 14 is formed at the substantial center of the upper surface 10a of the main body case 10 and is elongated in a right and left direction of the main body case. A slot cover 16 is arranged at the original insertion slot 14. As seen from FIGS. 1 and 2, the slot cover 16 is positioned in a horizontal position at which the slot cover 16 is flush with the upper surface 10a of the main body case 10 and closes the original insertion slot 14. The slot cover 16 is pivotable around rear ends of right and left side surfaces thereof between the horizontal position and an opening position where it is detached from the upper surface 10a and is inclined toward an up-backward direction in relation to the upper surface 10a.

An elongated recording-paper insertion slot 18 is formed in front of the original insertion slot 14 in the upper surface 10a of the main body case 10 so that the slot 18 is arranged in parallel with the original insertion slot 14.

A pair of stop levers 20 are arranged at the back of both longitudinal end portions of the recording paper insertion slot 18 on the upper surface 10a of the main body case 10. The pair of stop levers 20 are pivotable around their front end portions between a horizontal position where they are flush with the upper surface 10a of the main body case 10 as shown in FIG. 1 and a standing position where they are standing up from the upper surface 10a of the main body case 10 as shown in FIG. 2.

A recording-paper discharge slot 22 and an original discharge slot 24 are formed in a front end surface of the main body case 10 so that they are extending in a horizontal direction and are separated from each other in a vertical direction and are in parallel with each other.

Various input keys 25a for controlling the facsimile apparatus and a liquid crystal display panel 25b for displaying predetermined data are arranged in a region on the upper surface 10a of the main body case 10, which is located in front of the recording-paper insertion slot 18.

As shown in FIG. 2, an electrical unit 26 including various electrical and electronic elements is disposed in the rear half portion of the inner space of the main body case 10, and a wiring board 28 is arranged under the electrical unit 26 and extends along the inner surface of the bottom wall of the main body case 10.

An original guide path 30a is formed by a plurality of guide members 30 between the original insertion slot 14 and the original discharge slot 24 in the inner space of the main body case 10. A recording paper guide path 32a is further formed in the inner space of the main body case 10 by a plurality of guide members 32 between the recording-paper insertion slot 18 and the recording paper discharge slot 22. Recording-paper cutting means (not shown) is also arranged at the recording-paper discharge slot 22.

A guide roller 34, image reading means 36 and paper edge sensing means (not shown) are arranged along the original guide path 30a in the inner space of the main body case 10.

When an original (not shown) or an image carrying recording paper, such as a manuscript, a printed matter and a drawing, is introduced into the inner space of the main body case 10 through the original insertion slot 14, the original is fed in the original guide path 30a to the image reading means 36 by the guide roller 34 and is sent to the original discharge slot 24 by way of the rear half of the original guide path 30a after the image on the original is read by the image reading means 36.

The image read by the image reading means 36 is converted by the electrical unit 26 into corresponding electrical facsimile signals, and the facsimile signals are then transmitted to another facsimile apparatus (not shown) which is connected to the facsimile apparatus of the embodiment through a telephone line (not shown). When the paper edge sensing means (not shown) transmits a paper edge detection signal to the other facsimile apparatus (not shown), the other facsimile apparatus activates, on the basis of the received paper edge detection signal, its recording-paper cutting means disposed at its recording-paper discharge slot.

A recording-paper sensor 38, a printing head 40 as one kind of a recording head, a platen roller 42 that cooperates with the printing head 40, etc. are also arranged along the recording paper guide path 32a in the inner space of the main body case 10.

A thermosensitive paper is used as the recording paper and a thermal printing head is used as the printing head 40 in the facsimile apparatus of this embodiment. The recording paper introduced into the inner space of the main body case 10 through the recording-paper insertion slot 18 is led to the printing head 40 and the platen roller 42 by the recording-paper guide path 32a. When the facsimile apparatus of the embodiment receives electrical facsimile signals from the other facsimile apparatus (not shown) which is connected through the telephone line (not shown) to the facsimile apparatus of the embodiment, the facsimile apparatus of this embodiment prints an image by means of the printing head 40 on the recording paper on the basis of the received facsimile signals, and the printed recording paper is discharged from the facsimile apparatus through the recording-paper discharge slot 22.

Figure 3:
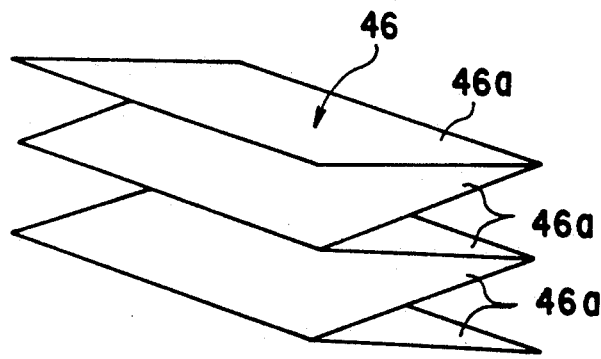
FIG. 3 is a schematic perspective view of the continuous recording paper folded in a predetermined length.

The facsimile apparatus of this embodiment can use a rolled continuous recording paper 44 as shown in FIG. 2 by a solid line or a folded regular-sized continuous recording paper 46 shown in FIG. 2 by a two-dot chain line. The folded regular-sized continuous recording paper 46 is folded in a predetermined length as shown in FIG. 3. The rolled recording paper 44 is wound around a cylindrical Winding shaft 44a made of for example paper, and each of folded ends of the folded regular-sized continuous recording paper 46 is defined by a perforation.

The width of the rolled continuous recording paper 44 and the width of the folded continuous recording-paper 46 are set to be equal with a width (210 mm) of A4 size paper which is the most prevailing size for recording paper in the facsimile apparatuses in Japan, and the length of each of the regular sized recording pieces of the folded continuous recording-paper 46 is set to be equal with a length (297 mm) of the A4 size paper.

However, these dimensions may be altered to meet the dimension of the most prevailing paper size in the country where the facsimile apparatus is used.

Even if in a case that any of the rolled continuous recording paper 44 and the folded continuous recording paper 46 is used, the paired stop levers 20 on the upper surface 10a of the main body case 10 are positioned to the standing position as shown in FIG. 2. Note that the paired stop levers 20 can be designed to stop at any desired standing angular position by the friction between the upper wall of the main body case 10 and the pivotal center portions of the paired stop levers 20.

A region in the upper surface 10a of the main body case 10, which is located in the back of the recording paper insertion slot 18, is used as a recording-paper receiving portion 50 on which recording paper is laid.

The rolled continuous recording paper 44 is laid on the recording-paper receiving portion 50, and is located immediately behind the paired stop levers 20, as shown in FIG. 2.

As the leading end of the rolled continuous recording paper 44 is drawn out from the rolled continuous recording paper 44 on the recording-paper receiving portion 50, the remaining part of the rolled continuous recording paper 44 rotates on the recording paper receiving portion 50 and slidingly contacts the paired stop levers 20 and the recording-paper receiving portion 50. In this state, the paired stop levers 20 keep the remaining part of the rolled continuous recording paper 44 in its predetermined posture or position in which the remaining portion is in parallel to the recording-paper insertion slot 18, and restrict the movement of the remaining part toward the recording-paper insertion slot 18.

Therefore, the drawn-out part of the rolled continuous recording paper is prevented from being obliquely introduced into the main body case 10 through the recording-paper insertion slot 18, the recording paper insertion slot 18 is prevented from being closed by the remaining part of the rolled continuous recording paper, and the remaining part of the rolled continuous recording paper 44 is prevented from being rolled down from the upper surface 10a of the main body case 10.

The drawn-out part of the rolled continuous recording paper 44 is led into the inner space of the main body case 10 through the recording-paper insertion slot 18, and then led to the printing head 40 and the platen roller 42 by the recording-paper guide path 32a.

When the folded continuous recording paper 46 is used, in place of the rolled continuous recording paper 44, the folded continuous recording paper 46 is laid on the recording-paper receiving portion 50 with the folded ends thereof being abutting against the paired stop levers 20.

When one recording paper piece 46a is drawn out from the folded continuous recording paper 46 on the recording-paper receiving portion 50, the remaining part of the folded continuous recording paper 46 is restricted from moving toward the recording-paper insertion slot 10 because the folded ends abut against the paired stop levers 20. Therefore, the drawn-out recording paper piece 46a is prevented from being obliquely led into the main body case 10 through the recording-paper insertion slot 18, the remaining part of the folded continuous recording paper 46 is prevented from stuffing the recording-paper insertion slot 18 so that the introduction of the draw-out recording paper piece 46a into the main body case 10 through the recording-paper insertion slot 18 is not prevented, and the remaining part of the folded continuous recording paper 46 is prevented from being rolled down from the upper surface 10a of the main body case 10.

Figure 4:
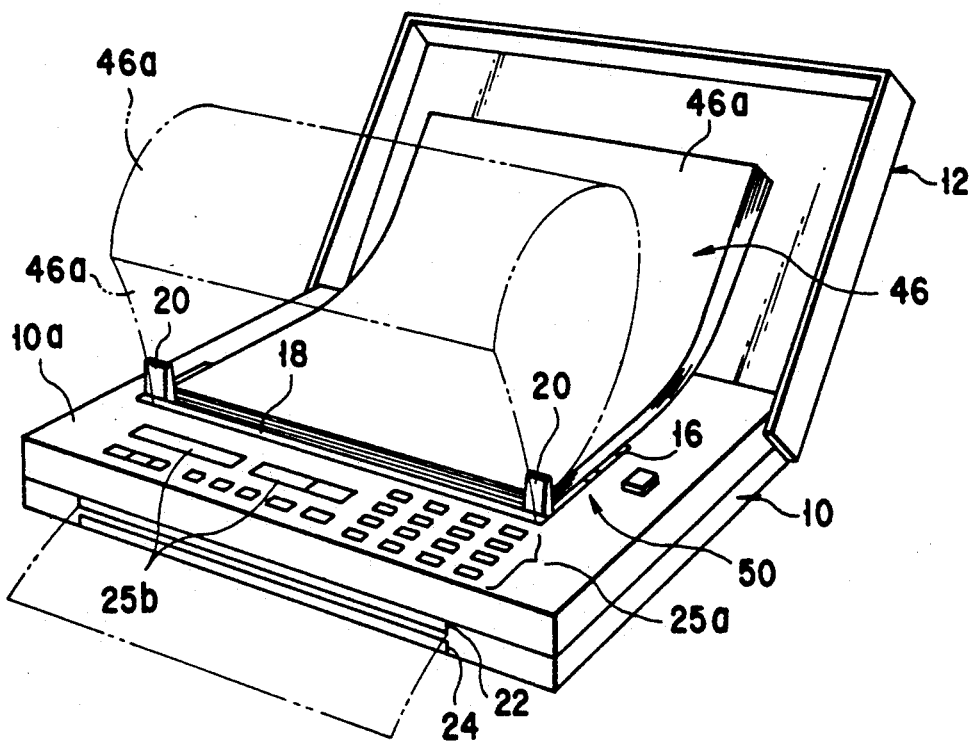
FIG. 4 is a schematic perspective view of the portable facsimile apparatus of FIG. 1, in a state that the continuous recording paper folded in the predetermined length is laid on the recording-paper receiving portion on the upper surface of the main body case, and is held in its predetermined position on the recording-paper receiving portion and is prevented from being moved toward the recording-paper insertion slot by the stop levers.

The recording paper piece 46a, drawn out from the folded continuous recording paper 46, is once raised from the recording-paper receiving portion 50 by its stiffness as shown by a two-dot chain line in FIG. 4, and then is curved to be oriented to the recording-paper insertion slot 18.

Figure 5:
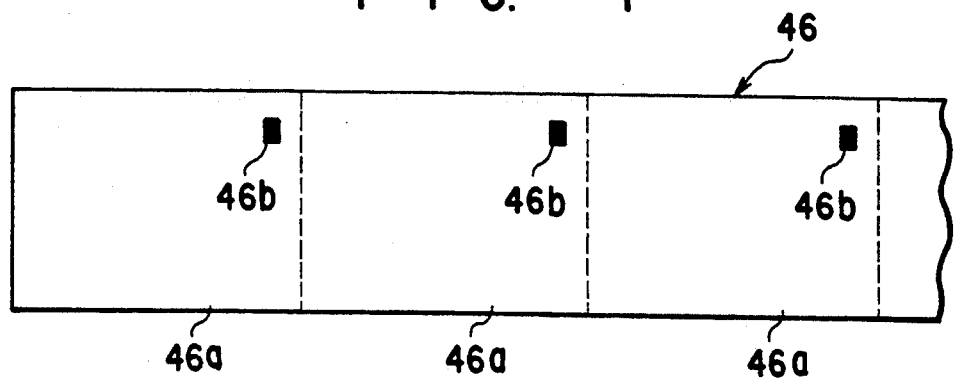
FIG. 5 is a schematic plan view of a folded regular-sized continuous recording paper in its unfolded state to show positioning marks printed respectively on regular-sized recording paper pieces of the continuous recording paper.

A positioning mark 46b is previously printed on a predetermined position on the back surface of each of the recording paper pieces 46a of the folded continuous recording paper 46, as shown in FIG. 5. When the positioning mark 46b is detected by the recording-paper sensor 38 disposed in the recording-paper guide path 32a, the drawn out recording paper piece 46a is conveyed by the platen roller 42 toward the recording-paper discharge slot 22 for a given distance and then the movement thereof is stopped. At this time, the folded edge between the printed recording paper piece and the non-printed next recording paper piece in the folded continuous recording paper 46 is located exactly at the recording-paper discharge slot 22, and the recording paper cutting means (not shown) cuts the folded continuous recording paper 46 along the folded edge between the printed recording paper piece and the non-printed next recording paper piece so that the printed recording paper piece is cut apart from the non-printed next recording paper piece.

Therefore, the printing head 40 can start printing of images at the predetermined constant positions on every non-printed recording paper piece in the folded continuous recording paper. In the above described embodiment, a pair of stop levers 20 are used as the remaining continuous recording paper-holding and movement restricting means. However, according to the invention, at least one stop lever located behind the recording-paper insertion slot 18 can function as the remaining continuous recording paper-holding and movement restricting means. Such a single stop lever can extend over the entire length of the recording-paper insertion slot 18, or can be placed at any desired position along the longitudinal directional of the recording-paper insertion slot 18 so long as the remaining part of the rolled or folded continuous recording paper is not obliquely arranged relative to the recording-paper insertion slot 18. Alternatively, more than two stop levers 20 may be provided.

Further, the stop lever 20 may be fixed in the standing position so long as it does not damage the portability of the portable facsimile apparatus.

FIG. 6 schematically shows a modification of the above described first embodiment. In this modification, in addition to the construction of the facsimile apparatus of the first embodiment, an optional cover 52 is further provided. The optional cover 52 covers the rolled continuous recording paper 44, laid on the recording-paper receiving portion 50 on the upper surface 10a of the main body case 10 of the facsimile apparatus, the recording-paper insertion slot 18, and the paired stop levers 20.

The optional cover 52 is detachably attached to a predetermined position on the upper surface 10a of the main body case 10 by known engaging means such as a pair of engaging pieces which are inserted into both longitudinal ends of the recording-paper insertion slot 18 and are frictionally engaged thereto.

When the optional cover 52 covers the paired stop levers 20, the rolled continuous recording paper 44 and the recording-paper insertion slot 18, the levers 20, the recording paper 44 and the insertion 18 are set in the same condition as those of the first embodiment as shown in FIG. 2.

Second Embodiment

A second embodiment of the present invention will be described by referring to FIGS. 7 through 11 of the accompanying drawings.

Figure 8:
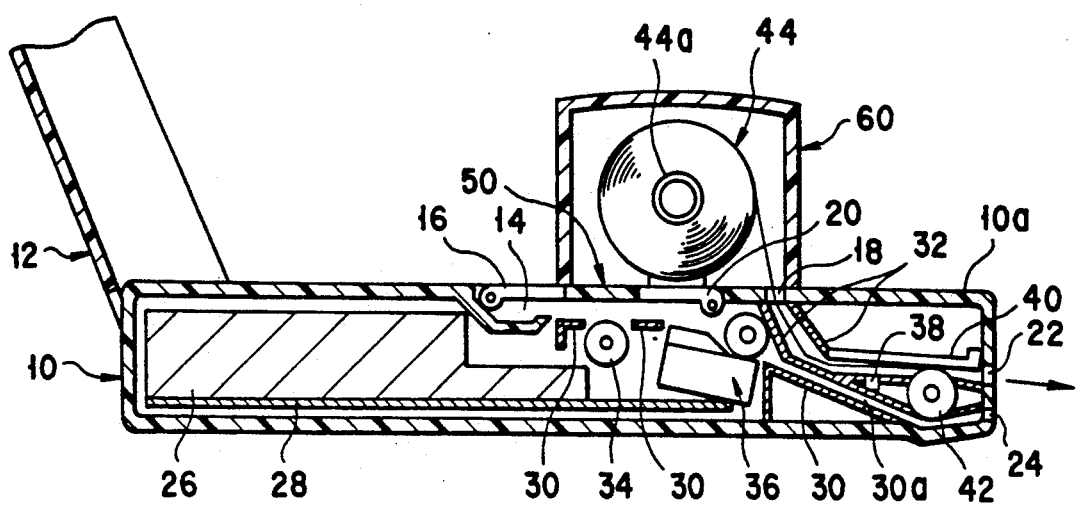
FIG. 8 is a schematic longitudinal sectional view of the portable facsimile apparatus of FIG. 7.

FIG. 7 schematically shows an outer appearance of a portable facsimile apparatus as a recording apparatus of the second embodiment, and FIG. 8 schematically shows a longitudinal sectional view of the portable facsimile apparatus of FIG. 7.

Since the basic construction of the portable facsimile apparatus of this embodiment is identical with that of the above described first embodiment, the common components in the first and second embodiments are indicated by the same reference numerals, and their detailed explanations will be omitted. Only the components of the second embodiment that are different from those of the first embodiment will be described below.

In the second embodiment, a rolled continuous recording paper 44 is contained in an oblong cover member 60, and is rotatably supported at its cylindrical winding shaft 44a by a pair of shaft members 62 which are coaxially and removably held by both longitudinal end walls 60a of the cover member 60.

Like the optional cover 52 of the modification of the first embodiment as shown in FIG. 6, the cover member 60 is removably attached to the recording-paper receiving portion 50 on the upper surface 10a of the main body case 10 by any known appropriate engaging means such as a pair of engaging pieces which are inserted into the right and left ends of the recording-paper insertion slot 18 and are frictionally engaged therewith. The cover member 60 covers the recording-paper insertion slot 18 and the pair of stop levers 20 on the upper surface 10a.

In this embodiment, the cover member 60 and the pair of shaft members 62 constitute a remaining continuous recording paper.rotatably holding member which is removably attached to the recording-paper receiving portion 50 on the upper surface 10a of the main body case 10 and rotatably holds both longitudinal ends of the rolled continuous recording paper 44. Such remaining continuous recording paper.rotatably holding member constitutes remaining continuous recording paper.holding and movement restricting means for the rolled continuous recording paper 44.

While the cover member 60 is removably attached to the recording-paper receiving portion 50 on the upper surface 10a of the main body case 10, the pair of stop levers 20 are held at a horizontal position so as not to hinder the rotation of the rolled continuous recording paper 44 in the cover member 60.

While a leading end of the rolled continuous recording-paper 44 is drawn out from the cover member 60 and is led toward the printing head 40 in the main body case 10 through the recording-paper insertion slot 18, the remaining part of the rolled continuous recording paper 44 is rotatably held in a predetermined position on the recording-paper receiving portion 50 and is kept in a predetermined posture or position in which the remaining part of the rolled continuous recording paper 44 is in parallel to the recording-paper insertion slot 18, by the pair of shaft members 62 and the cover member 60, and the remaining part of the rolled continuous recording paper 44 is prevented from being moved toward the recording-paper insertion slot 18.

Figure 9:
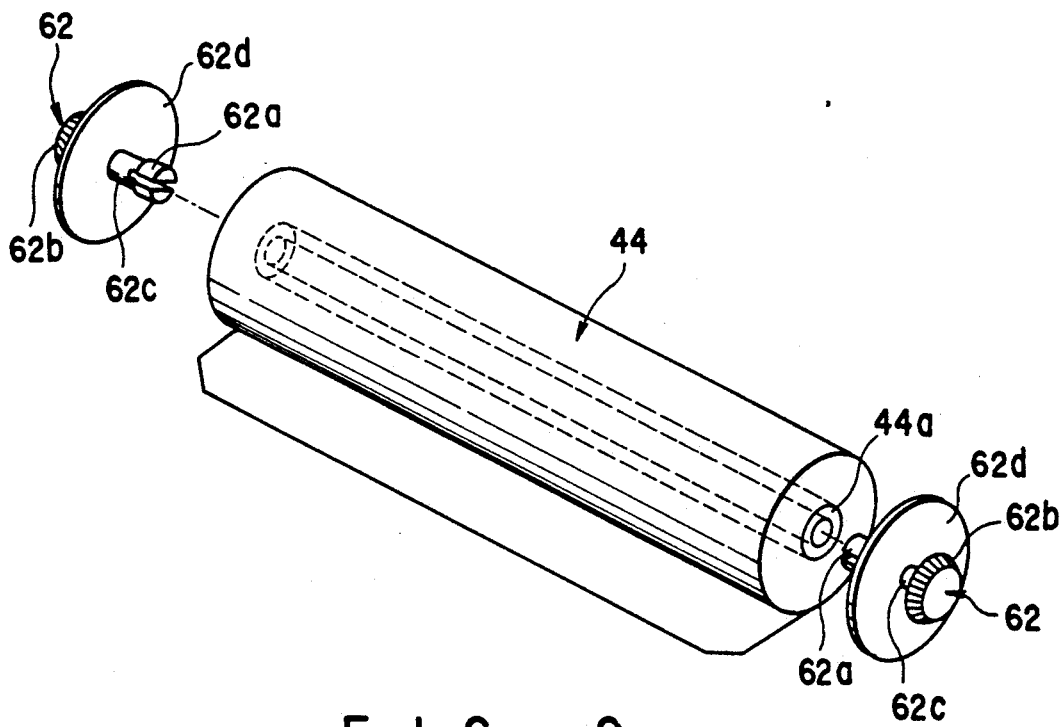
FIG. 9 is a schematic perspective view of the rolled continuous recording paper and a pair of shaft members for supporting both ends of the rolled continuous recording paper.

FIG. 9 schematically shows an appearance of the rolled continuous recording-paper 44 and the pair of shaft members 62 which are removably attached to both end openings of the winding shaft 44a of the rolled continuous recording paper 44.

Each of the paired shaft members 62 has a split center shaft 62c, on the split end portion of which a frictional engagement portion 62 is formed to be inserted into one of the end openings of the winding shaft 44a of the rolled continuous recording paper 44 and frictionally engage therewith, and on the other end portion of which a knob 62b is formed. A collar 62d is coaxially formed on the center shaft 62c at a position between the both end portions. The diameter of the collar 62d is slightly larger than the maximum diameter of the rolled continuous recording paper 44. The split frictional engagement portion 62a of the center shaft 62c is inserted into one of the end openings of the winding shaft 44a of the rolled continuous recording paper 44 until the collar 62d abuts the corresponding longitudinal end of the rolled continuous recording paper 44.

Figure 10:
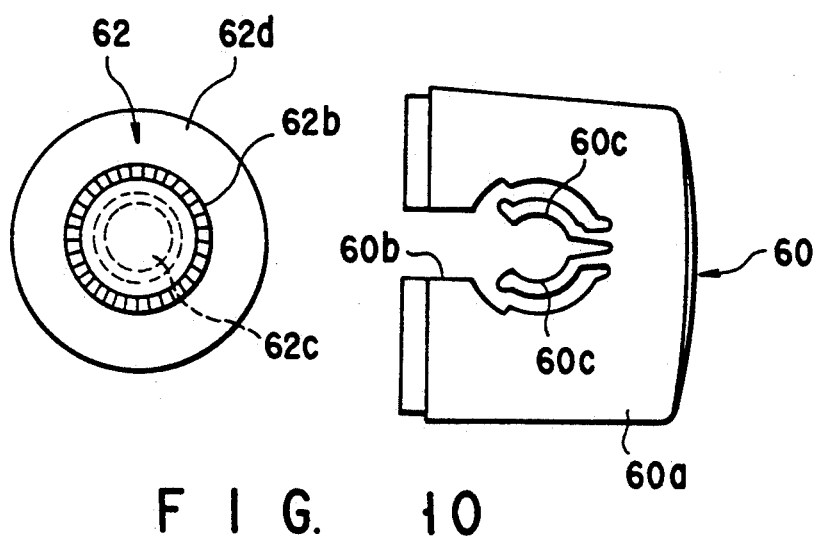
FIG. 10 is a schematic side view of the cover member of the portable facsimile apparatus of FIG. 7 and on of the shaft members separated from the cover member.
Figure 11:
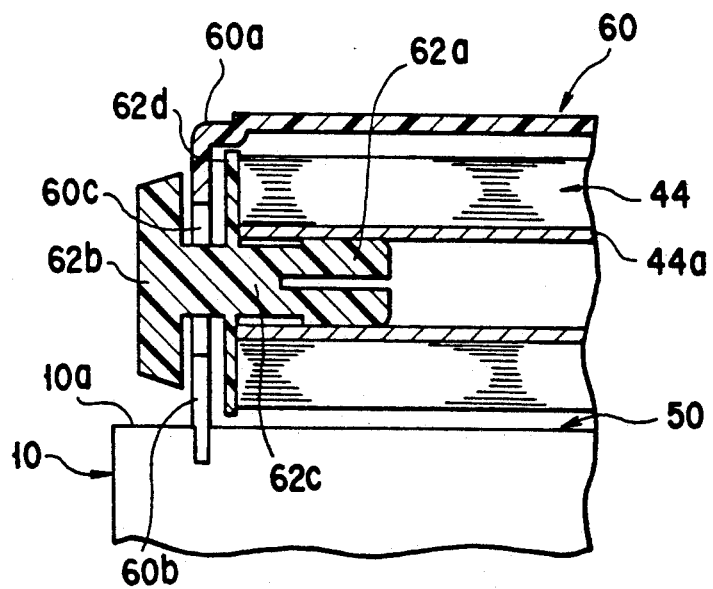
FIG. 11 is a schematic longitudinal sectional view, in which one shaft member, corresponding to one longitudinal end portion of the cover member of the portable facsimile apparatus of FIG. 7, is attached to a corresponding one end portion of a winding shaft of the rolled continuous recording paper and is rotatably held by the longitudinal end portion of the cover member.

In FIG. 10, one of the longitudinal end walls 60a of the cover member 60 and one of the paired shaft members 62 to be used to cooperate with the above described one end wall are shown in an enlarged scale. The other longitudinal end wall 60a of the cover member 60 is so formed that it has the same configuration and size as those of the above described one longitudinal end wall 60a.

A shaft insertion slot 60b is formed in the longitudinal end wall 60a so as to extend from the center of its lower edge to the center portion of the wall. The width of the entrance of the shaft insertion slot 60b is slightly larger than the diameter of the center shaft 62c of each of the paired shaft members 62. The inner end portion of the shaft insertion slot 60b is enlarged to have a substantially circular shape, and a pair of curved elastic holding lugs 60c are formed in the inner end portion of the slot 60b. The pair of curved elastic holding lugs 60c form a circle having a diameter substantially equal to that of the center shaft 62c of each of the shaft members 62, and the circle is opened toward the entrance of the shaft insertion slot 60b.

The center shaft 62c of each of the pair of shaft members 62 is inserted at its portion located between the collar 62d and the knob 62b into the entrance of the shaft guide slot 60b of the corresponding longitudinal end wall 60a of the cover member 60, and is detachably and rotatably held by the pair of elastic holding lugs 60c arranged in the inner end portion of the corresponding shaft insertion slot 60b.

In a case that the folded continuous recording paper 46 as shown in FIG. 3 is used in place of the rolled continuous recording paper 44, the same state as that in FIG. 4 of the above described first embodiment is set. More specifically, the pair of stop levers 20 are located at their standing positions under the condition that the cover member 60 supporting the pair of shaft members 62 and the rolled continuous recording paper 44 is detached from the predetermined position on the upper surface 10a of the main body case 10, and the folded continuous recording paper 46 is laid on the recording-paper receiving portion 50 on the upper surface 10a of the main body case 10 in such a manner that the folded edges of the folded continuous recording paper 46 abut against the standing stop levers 20.

Further, a leading end of the folded continuous recording paper 46 drawn out from the folded continuous recording paper 46 laid on the recording-paper receiving portion 50 is led to the printing head 40 in the main body case 10 through the recording-paper insertion slot 18 in the upper surface 10a of the main body case 10.

Third Embodiment

A third embodiment of the present invention will be descried below by referring to FIGS. 12 through 16 of the accompanying drawings.

Figure 12:
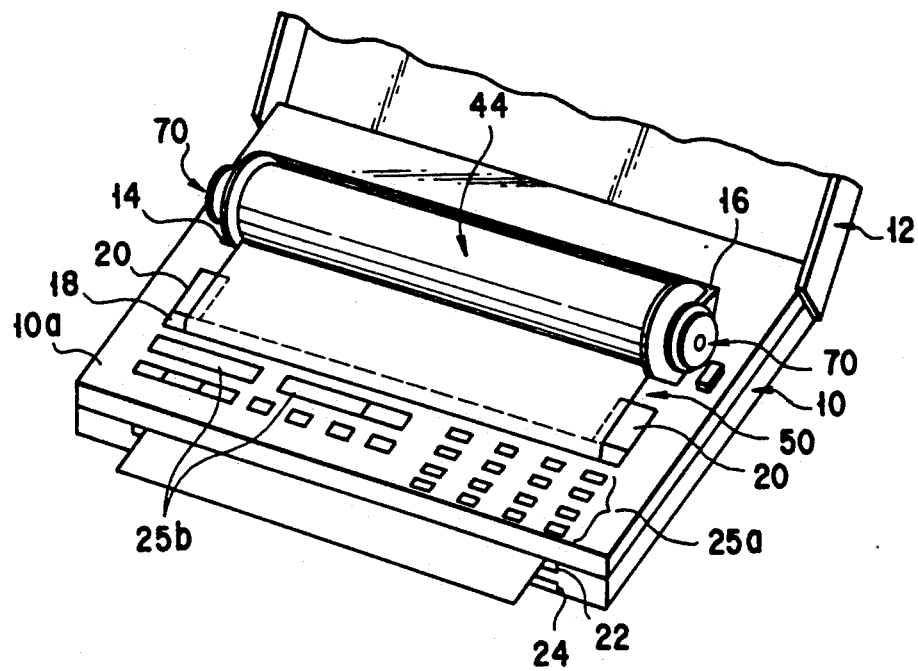
FIG. 12 is a schematic perspective view of a portable facsimile apparatus as a recording apparatus of a third embodiment of the invention, in which a rolled continuous recording paper is rotatably held by a pair of shaft members.

FIG. 12 schematically shows a portable facsimile apparatus as a recording apparatus of the third embodiment. In this embodiment, the rolled continuous recording paper is laid on the recording-paper receiving portion on the upper surface of the main body case of the portable facsimile apparatus and is held by a continuous-recording-paper rotatably holding member functioning also as a remaining continuous recording paper.- holding and movement restricting means.

Figure 13:
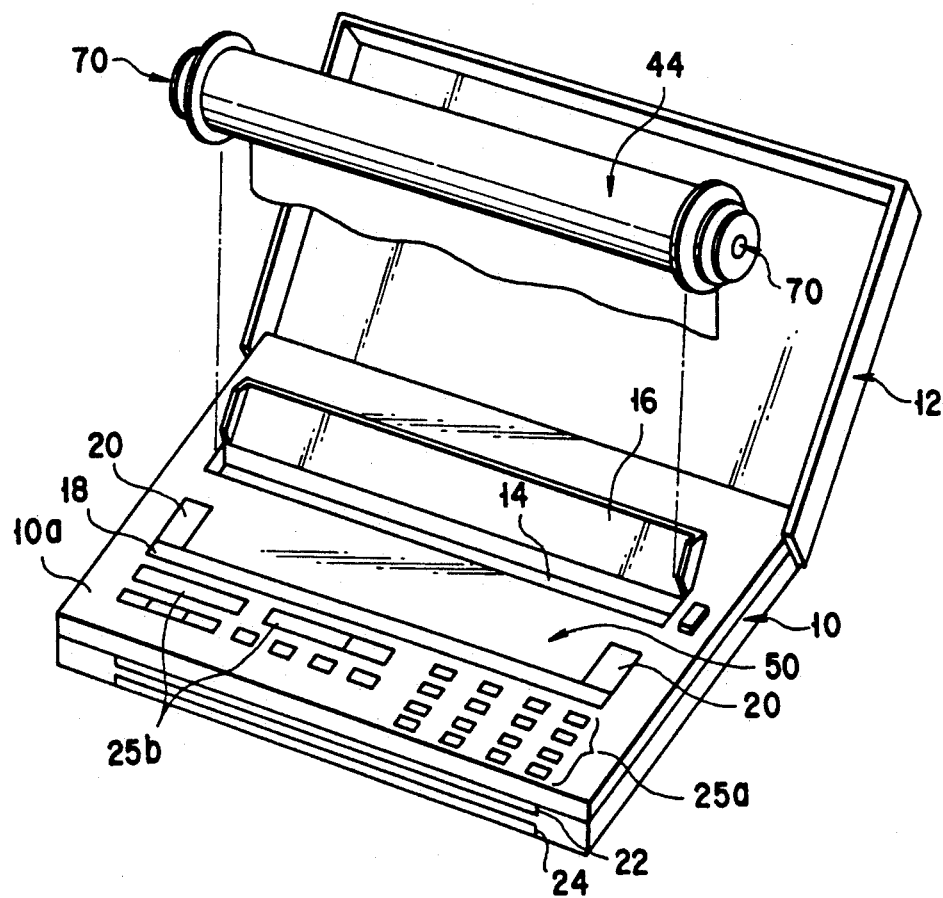
FIG. 13 is a schematic perspective view, in which the rolled continuous recording paper held by a pair of shaft members in the portable facsimile apparatus of FIG. 12 is detached from the opened entrance of the original insertion slot.

FIG. 13 schematically shows a state in which the rolled continuous recording paper held by the continuous-recording-paper rotatably holding member is detached from the recording-paper receiving portion on the upper surface of the portable facsimile apparatus in the third embodiment of FIG. 12.

Since the basic construction of the portable facsimile apparatus of this embodiment is the same as that of the above described first embodiment, the components of this embodiment which are the same as those of the first embodiment are indicated by the identical reference numerals and the detailed explanations thereof will be omitted, and the components of this embodiment that are different from those of the first embodiment will be described below in detail.

In this embodiment, a pair of shaft members 70 are coaxially and removably attached to both longitudinal ends of the rolled continuous recording paper 44 so as to function as a continuous-recording-paper rotatably holding member, and the rolled continuous recording paper 44, together with the paired shaft members 70, is laid in the entrance of the original insertion slot 14 opened in the upper surface 10a of the main body case 10 of the portable facsimile apparatus.

FIG. 14 schematically shows an appearance of the pair of shaft members 70 which are removably attached to the longitudinal end openings of the winding shaft 44a of the rolled continuous recording paper 44.

Each of the pair of shaft members 70 includes a center shaft 70c having at its one end portion a split frictional engaging portion 70a to be inserted into one of the both end openings of the winding shaft 44a of the rolled continuous recording paper 44 and frictionally engaged therewith, and at its other end portion a knob 70b. The center shaft 70c is coaxially and rotatably held by a circular plate shaped collar 70d at a portion thereof between the above described one end and the other end. The diameter of the collar 70d is slightly larger than the maximum diameter of the rolled continuous recording paper 44. The split frictional engaging portion 70a of the shaft member 70c is inserted into the corresponding end opening of the winding shaft 44a of the rolled continuous recording paper 44 until the collar 70d abuts the corresponding longitudinal end surface of the rolled continuous recording paper 44.

FIGS. 15 and 16 show the one end portion of the rolled continuous recording paper 44 which is laid on the opened entrance of the original insertion slot 14 in the upper surface 40a of the main body case 10 of the portable facsimile apparatus in a state that the pair of shaft members 70 are attached to the both ends of the rolled continuous recording paper 44.

As shown in FIGS. 15 and 16, the collars 70d of the pair of shaft members 70 are supported by the front edge of the entrance of the original insertion slot 14 and the back surface of the slot cover 16 located at its opening position at the both longitudinal ends of the entrance of the original insertion slot 14, so that the center shafts 70c and the knobs 70b can not touch the upper surface 10a of the main body case 10.

Original insertion guide lugs 16a formed at both longitudinal ends of the back surface of the slot cover 16 touch or locate near the outer side surfaces of the collars 70d of the paired shaft members 70. The original insertion guide lugs 16a stabilize the longitudinal position of the collars 70d in the entrance of the original insertion slot 14, so that the leading end of the rolled continuous recording paper 44 and the subsequent portion thereof can be smoothly drawn out from the rolled continuous recording paper 44 supported by the pair of shaft members 70.

When the rolled continuous recording paper 44, together with the paired shaft members 70, is placed in the opened entrance of the original insertion slot 14 in the upper surface 10a of the main body case 10 of the portable facsimile apparatus, the pair of stop levers 20 are located at their horizontal positions as shown in FIG. 12 so that they do not prevent the loading end of the rolled continuous recording-paper 44 which is drawn out from the rolled continuous recording paper 44 on the pair of shaft members 70 from being introduced into the recording-paper insertion slot 18.

Since the collars 70d of the pair of shaft members 70 are supported by the front edge of the entrance of the original insertion slot 14 and the back surface of the slot cover 16 located at its open position, the remaining part of the rolled continuous recording paper 44 and/or the pair of shaft members 70 are held in its predetermined posture in which the remaining portion of the rolled continuous recording paper 44 is in parallel to the recording-paper insertion slot 18 and is restricted to move toward the recording-paper insertion slot 18 while the leading end of the rolled continuous recording paper 44 is drawn out from the rolled continuous recording paper 44. Thus, the pair of shaft members 10 constitute remaining continuous recording paper.holding and movement restricting means by cooperating the shaft members 70 with the original insertion slot 14.

When the folded continuous recording-paper 46 as shown in FIG. 3 is used in place of the rolled continuous recording paper 44 in the above described third embodiment, a state which is the same is that illustrated in FIG. 4 of the first embodiment is set.

Fourth Embodiment

A fourth embodiment according to the present invention will be described by referring to FIGS. 17 through 21 of the accompanying drawings.

FIG. 17 schematically shows a longitudinal cross sectional view of a portable facsimile apparatus as a recording apparatus of the fourth embodiment. In this portable facsimile apparatus the rolled continuous recording paper 44 is held in its predetermined posture or position on the recording-paper receiving portion 50 of the upper surface 10a of the main body case 10 by the paired stop levers 20 located at their stand-up positions as the remaining continuous recording paper.holding and movement restricting means. To a lower surface 10b located in the back side of the upper surface 10c in the main body case 10, a battery box 80 is removably attached.

The portable facsimile apparatus of this embodiment can include the various remaining continuous recording paper.holding and movement restricting means used in the portable facsimile apparatuses of the above described first to third embodiments, and can use the folded continuous recording paper 46 in place of the rolled continuous recording paper 44.

FIG. 18 schematically shows a state in which the battery box 80 is detached from the lower surface 10b of the main body case 10 in the portable facsimile apparatus of FIG. 17.

Since the basic construction of the portable facsimile apparatus of this embodiment is the same as that of the above described first embodiment, the components of this embodiment which are the same as those of the first embodiment are indicated by identical reference numerals and their detailed explanations will be omitted. Only the components of the embodiment that are different from those of the first embodiment will be described below in detail.

When the battery box 80 is placed on the upper surface of a desk 100 while being attached to the lower surface 10b of the main body case 10 as shown in FIG. 17, the battery box 80 is located between the upper surface of the desk 100 and the lower surface 10b of the main body case 10 to make the main body case 10 forwardly incline.

The battery box 80 is shaped to have a substantially rectangular form as shown in FIG. 18, and has four engaging arms 80a projecting upward from the four corners of the upper surface of the battery box 80. An upper end of each of the engaging arms 80a bends inwardly in the width direction of the battery box 80 to form an engaging pawl.

A pair of terminal openings 80b is formed in the upper surface of the battery box 80, and a pair of output terminals 82 are exposed in the openings 80b.

An elastic engaging lug 80c is formed in the upper surface of the battery box 80 at a front edge extending in the width direction of the upper surface. The elastic engaging lug 80c projects upwardly from the front edge, and the upper end of the lug 80c bends forwardly and then bends slightly and downwardly to form a click type engaging pawl.

Four engaging slots 84 and an elastic engaging slot 86 are formed in a predetermined region in the lower surface 10b of the main body case 10 to receive the upper end portions of the engaging arms 80a and the upper end portion of the elastic engaging lug 80c of the battery box 80. Each of the engaging slots 84 and 86 is elongated in the back and forth direction of the lower surface 10b of the main body case 10, and the front half portion of each of the engaging slots 84 is narrower than the rear half portion.

When the upper end portions of the four engaging arms 80a and the elastic engaging lug 80c of the battery box 80 are inserted into the wide rear half portions of the corresponding engaging slots 84 and 86 and then the battery box 80 is moved forwardly along the lower surface 10b of the main body case 10, the engaging pawls of the upper end portions of the four engaging arms 80a are engaged with the narrow front half portions of the engaging slots 84 in the vertical direction and the click-type elastic engaging pawl of the upper end of the elastic engaging lug 80c is elastically engaged with an engaging groove (not shown in FIGS. 17 and 18) formed in the inner surface of the front edge of the elastic engaging slot 86.

As shown in FIG. 18, a terminal contact opening 88 is formed in a predetermined portion in the lower surface 10b of the main body case 10 which opposes the pair of terminal openings 80b in the upper surface of the battery box 80 when the battery box 80 is removably attached to the predetermined region in the lower surface 10b of the main body case 10. A pair of input terminals 90 for contacting the paired output terminals 82 in the paired terminal openings 80b in the upper surface of the battery box 80 are disposed in the terminal contact opening 88. Theses input terminals 90 are electrically connected with the wiring board 28 in the main body case 10 shown in FIG. 19.

A bottom lid 92 for the terminal contact opening 88 is provided in the lower surface 10b of the main body case 10. The bottom lid 92 is arranged in a recess 94 formed in a predetermined portion in the lower surface 10b of the main body case 10, and the terminal contact opening 88 is arranged at a rear end of the recess 94.

Figure 19:
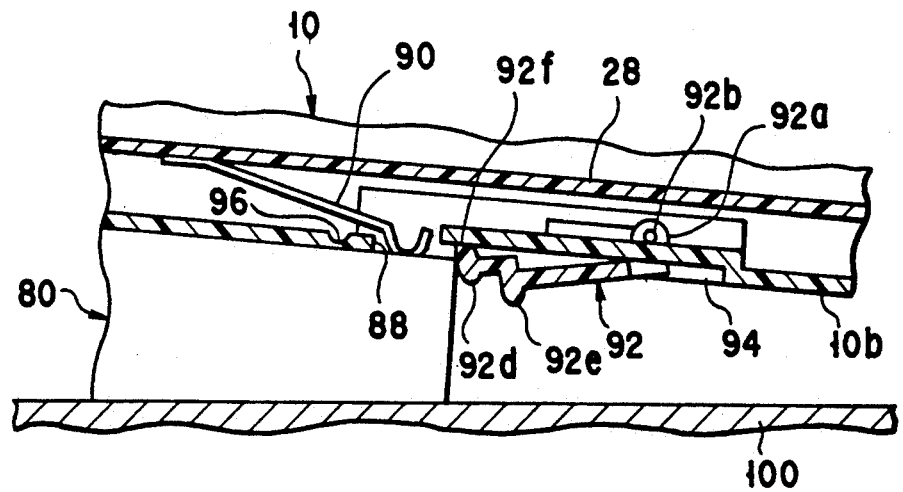
FIG. 19 is an enlarged schematic longitudinal sectional view showing a portion of the lower surface of the main body case and the battery box of the portable facsimile apparatus of FIG. 17, in which the battery box is attached to the main body case.

FIG. 19 schematically shows a longitudinal sectional view of a part of the lower surface 10b of the main body case 10 located near the terminal contact opening 88.

As seen from FIG. 19, a pair of tab-shaped portions 92a are formed in the rear end of the bottom lid 92 and are put into a pair of slots formed in the rear end of the recess 94 so as to extend in the back and forth direction, and a shaft 92b is passed through the tab-shaped portions 92a in the inner space of the main body case 10. The bottom lid 92 is movable in the back and forth direction along the lower surface 10b of the main body case 10 within a range defined by the pair of slots in the recess 94, and is rotatable around the shaft 92b passing through the tab-shaped portions 92a.

An elastic engaging projection 92d and a lifting projection 92e which is higher in height than the elastic engaging projection 92d are formed in the lower surface of the front end portion of the bottom lid 92 so as to project downwardly. In the upper surface of the front end portion, an auxiliary lifting projection 92f is formed so as to project upwardly.

An engaging recess 96 is formed in the rear edge of the terminal contact opening 88 in the inner surface of the lower wall of the main body case 10 for engagement with the elastic engaging projection 92d of the bottom lid 92.

As seen from FIGS. 18 and 19, the bottom lid 92 opens the terminal contact opening 88 when the lid 92 is arranged at its front end position in the recess 94, so that the battery box 80 can be attached to the predetermined position in the lower surface 10b of the main body case 10 as clearly illustrated in FIG. 19.

Figure 20:
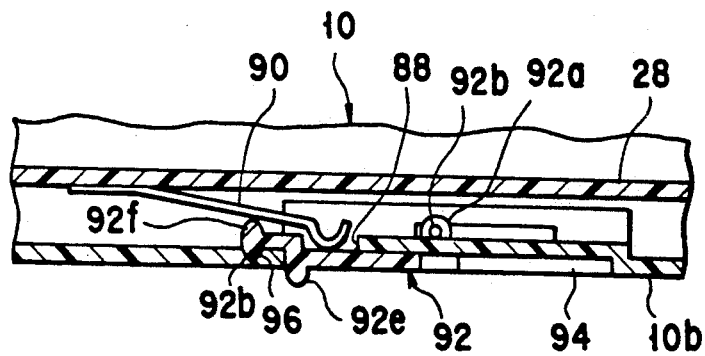
FIG. 20 is a schematic longitudinal sectional view showing a state that the battery box is removed from the lower surface of the main body case of the portable facsimile apparatus of FIG. 17 and an opening for a terminal contact is closed by a bottom lid.
Figure 21:
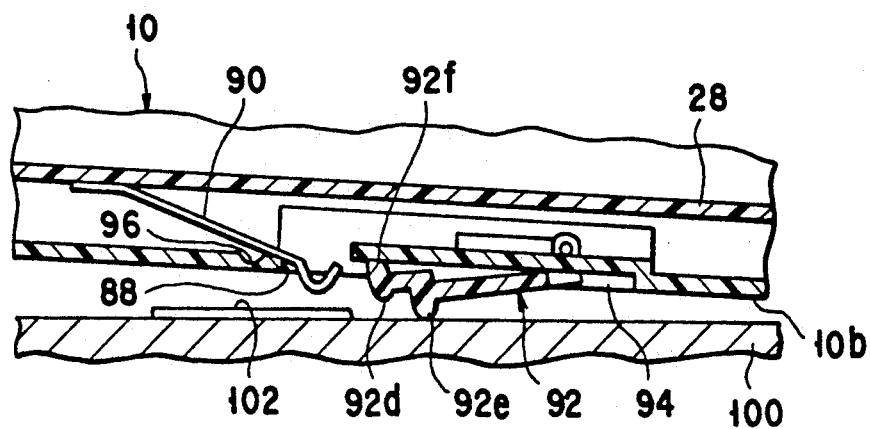
FIG. 21 is a schematic longitudinal sectional view showing a state that the battery box is removed from the lower surface of the main body case, the bottom lid is moved to its open position and the main body case is laid on an upper surface of a desk.

When the battery box 80 is detached from the predetermined position in the lower surface 10b of the main body case 10, the bottom lid 92 is moved to its rear end position, as shown in FIG. 20, and held at the rear end position as the elastic engaging projection 92d in its rear end portion is engaged with the engaging recess 96 in the inner surface of the lower wall of the main body case 10. The bottom lid 92 located at the rear end position closes the terminal contact opening 88 in the lower surface 10b of the main body case 10 and prevents foreign objects from entering into the inner space of the main body case 10 through the terminal contact opening 88.

Particularly, when the portable facsimile apparatus is placed on the upper surface of the desk, the bottom lid 92 prevents any conductive members such as paper clips and staples left on the desk from contacting the pair of input terminals 90 in the terminal contact opening 88 and from entering into the inner space of the main body case 10 through the terminal contact opening 88 and contacting the wiring board 28. Therefore, the electrical circuit of the portable facsimile apparatus is prevented from being short circuited.

In a case that the battery box 80 is detached from the predetermined position in the lower surface 10b of the main body case 10 and the portable facsimile apparatus is placed on the upper surface of the desk without moving the bottom lid 92 to its rear end position shown in FIG. 20, the auxiliary lifting projection 92f disposed at the rear end of the upper surface of the bottom lid 92 abuts the bottom wall of the recess 94 in the lower surface 10b of the main body case 10 and the lifting projection 92e disposed at the rear end of the lower surface of the bottom lid 92 abuts the upper surface of the desk 100, so that the main body case 10 is lifted up from the upper surface of the desk 100.

Therefore, the terminal contact opening 88 in the lower surface 10b of the main body case 10 can be kept away from the upper surface of the desk 100, so that the conductive members 102 such as paper clips or staples left on the upper surface of the desk 100 are prevented from contacting the paired input terminals 90 in the terminal contact opening 88 and from entering into the inner space of the main body case 10 through the terminal contact opening 88 and contacting the wiring board 28.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A compact type portable recording apparatus comprising:
   a flat main body case having a substantially flat upper surface, a recording-paper insertion opening formed in the substantially flat upper surface, and a recording-paper discharge opening positioned in the main body case at a position lower than the recording-paper insertion opening, said flat main body case not carrying a supply of recording paper in the interior thereof;
   a recording head and recording head control means, both of which are contained in the main body case, the recording head recording images on a recording paper which is fed through the recording-paper insertion opening, under the control of the recording head control means;
   a recording-paper receiving portion on the substantially flat upper surface of the main body case at a position adjacent to the recording-paper insertion opening nd located above both the recording head and recording head control means, and on which a continuous recording paper is laid by a user; and
   engaging the movement restricting means, mounted on the recording-paper receiving portion and projecting upward, for engaging and holding a remaining part of the continuous recording paper and for restricting a movement of the remaining part of the continuous recording paper toward the recording-paper insertion opening, while a part of the continuous recording paper is inserted into the main body case through the recording-paper insertion opening and is discharged from the main body case through the recording-paper discharge opening after an image has been recorded on the inserted part of the continuous recording paper by the recording head in the main body case.

2. A compact type portable recording apparatus according to claim 1, wherein:
   the continuous recording paper is wound to be in a roll shape; and
   the engaging and movement restricting means includes a cover, which is removably attached to the recording-paper receiving portion on the upper surface of the main body case, the cover covering the continuous roll shape recording paper when laid on the recording-paper receiving portion, and which also covering the recording-paper insertion opening.

3. A compact type portable recording apparatus according to claim 1, wherein:
   the continuous recording paper is wound to be in a roll shape; and
   the engaging and movement restricting means includes a continuous-recording-paper rotatably holding means, which is detachably attached to the recording-paper receiving portion on the upper surface of the main body case, for rotatably holding both longitudinal ends of the continuous roll shape recording paper.

4. A compact type portable recording apparatus according to claim 3, wherein the continuous-recording-paper rotatably holding means includes:
   a pair of shaft portions coaxially and detachably attached to both longitudinal ends of the continuous roll shape recording paper; and
   a cover portion detachably holding the pair of shaft portions, and for allowing rotation of the pair of shaft portions, the cover portion covering the entire outer surface of the continuous roll shape recording-paper and the recording-paper insertion opening in the upper surface of the main body case while the cover portion is detachably attached to the recording-paper receiving portion.

5. A compact type portable recording apparatus according to claim 1, wherein:
   image reading means is further provided in an inner space of the main body case;
   the main body case further comprises an image-carrying-recording-paper insertion opening, through which an image carrying recording paper carrying an image to be electrically transmitted or copied is introduced into the inner space of the main body case; and an image-carrying-recording-paper discharge opening, through which the image carrying recording paper is discharged from the inner space after the image carried on the image carrying recording paper is read by the image reading means; and
   the image-carrying-recording-paper insertion opening is arranged in a region of the recording-paper receiving portion on the upper surface of the main body case.

6. A compact type-portable recording apparatus according to claim 1, wherein:
the engaging and movement restricting means includes a continuous-recording-paper rotatable holding member, which is detachably attached to the recording-paper receiving portion on the upper surface of the main body case and which rotatably holds both longitudinal ends of a roll shape continuous recording paper; and at least one stop member mounted on the recording-paper receiving portion and which is movable between a retracted position where the at least one stop member is retracted in the recording-paper receiving portion and a projecting position where the at least one stop member is projecting upward from the recording-paper receiving portion; and
the at least one stop member is positioned at its projecting position when a folded continuous recording paper is laid on the recording-paper receiving portion, and abuts the recording-paper inserting opening side end of the folded continuous recording paper, so that the stop member holds the remaining part of the continuous recording paper on the recording-paper receiving portion to keep its predetermined position and restricts the movement of the remaining part of the recording paper toward the recording-paper insertion opening.

7. A compact type portable recording apparatus according to claim 6, wherein:
the continuous-recording-paper rotatable holding member includes a pair of shaft portions coaxially and detachably attached to both longitudinal ends of a roll shape continuous recording paper, and a cover portion detachably holding the paired shaft portions, for allowing rotation of the pair of shaft portions and the cover portion covering the entire outer surface of the roll shape continuous recording-paper and the recording-paper insertion opening in the upper surface of the main body case while the cover is detachably attached to the recording-paper receiving portion.

8. A compact type portable recording apparatus according to claim 6, wherein:
the at least one stop member is pivotable between a horizontal retracted position where the stop member is located in the same plane as the upper surface of the main body case and a standing projecting position where the stop member is standing up from the upper surface of the main body case.

9. A compact type portable recording apparatus according to claim 1, wherein:
the recording apparatus further comprises a battery box detachably attached to a lower surface of the main body case, the lower surface being located in the back side of the main body case in relation to the upper surface on which the recordingpaper receiving portion is located;
an opening is formed in the lower surface of the main body case, through which electrical terminals to be connected with terminals of the battery box are exposed;
the main body case has a bottom lid which is movable between a closed position wherein the opening is covered by the bottom lid and an open position where the opening is fully exposed; and
the bottom lid does not contact a surface of an object when the bottom lid is positioned in the closed position and the main body case is laid on the surface of the object, and the bottom lid abuts the surface of the object to separate by a predetermined distance the opening in the lower surface of the main body case from the surface of the object when the bottom lid is positioned in the opened position and the main body case is laid on the surface of the object.

10. A compact type portable recording apparatus according to claim 1, wherein:
the engaging and movement restricting means includes at least one stop member mounted on the recording-paper receiving portion and is movable between a projecting position where the stop member is projecting upward from the recording-paper receiving portion and a retracted position where the stop member is retracted in the recording-paper receiving portion; and
the at least one stop member abuts the recording-paper insertion opening side end of the outer surface of the continuous recording paper laid on the recording-paper receiving portion when the at least one stop member is positioned at its projecting position so that the at least one stop member holds a remaining part of the continuous recording paper on the recording-paper receiving portion to keep its predetermined position and restricts movement of the remaining part of the continuous recording paper toward the recording-paper insertion opening.

11. A compact type portable recording apparatus according to claim 10, wherein:
the continuous recording paper is wound to be in a roll shape; and
the engaging and movement restricting means includes a cover, which is removably attached to the recording-paper receiving portion on the upper surface of the main body case and which covers the continuous recording paper laid on the recording-paper receiving portion, and which also covers the recording-paper insertion opening.

12. A compact type portable recording apparatus according to claim 10, wherein:
the at least one stop member is pivotable between a horizontal retracted position where the stop member is located in the same plane as the upper surface of the main body case and a standing projecting position where the stop member is standing up from the upper surface of the main body case.

13. A compact type portable recording apparatus according to claim 12, wherein:
the continuous recording paper is wound to be in a roll shape; and
the engaging and movement restricting means includes a cover, which is removably attached to the recording-paper receiving portion on the upper surface of the main body case and which covers the continuous recording paper laid on the recording-paper receiving portion, and which also covers the recording-paper insertion opening.

* * * * *